United States Patent
Baird et al.

(10) Patent No.: US 7,565,498 B1
(45) Date of Patent: Jul. 21, 2009

(54) SYSTEM AND METHOD FOR MAINTAINING WRITE ORDER FIDELITY IN A DISTRIBUTED ENVIRONMENT

(75) Inventors: Robert Baird, San Jose, CA (US); Anand A. Kekre, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 241 days.

(21) Appl. No.: 11/268,116

(22) Filed: Nov. 7, 2005

(51) Int. Cl.
  *G06F 13/00* (2006.01)
(52) U.S. Cl. .................. 711/158; 711/151; 710/39; 710/40
(58) Field of Classification Search .......... 711/158, 711/151; 710/39, 40
  See application file for complete search history.

(56) References Cited

U.S. PATENT DOCUMENTS

| | | | | |
|---|---|---|---|---|
| 5,446,871 | A * | 8/1995 | Shomler et al. | 714/1 |
| 5,898,840 | A * | 4/1999 | Guzovskiy et al. | 709/226 |
| 6,681,320 | B1 * | 1/2004 | Marr | 712/216 |
| 7,072,342 | B1 * | 7/2006 | Elnathan | 370/394 |
| 7,103,727 | B2 * | 9/2006 | Morishita et al. | 711/147 |
| 7,254,685 | B1 * | 8/2007 | Cardente | 711/162 |
| 2004/0064633 | A1 * | 4/2004 | Oota | 711/100 |
| 2005/0066046 | A1 * | 3/2005 | Chadalapaka | 709/230 |
| 2005/0160248 | A1 | 7/2005 | Yamagami | 711/170 |
| 2006/0026460 | A1 | 2/2006 | Goldberg et al. | 714/8 |
| 2006/0265466 | A1 * | 11/2006 | Yasui et al. | 709/213 |
| 2007/0005928 | A1 * | 1/2007 | Trika et al. | 711/202 |
| 2007/0022264 | A1 * | 1/2007 | Bromling et al. | 711/162 |
| 2008/0016300 | A1 * | 1/2008 | Yim et al. | 711/162 |
| 2008/0059738 | A1 * | 3/2008 | Burr et al. | 711/162 |

* cited by examiner

*Primary Examiner*—Hetul Patel
(74) *Attorney, Agent, or Firm*—Campbell Stephenson LLP

(57) ABSTRACT

Various systems and methods for maintaining write order fidelity in a distributed environment are disclosed. One method, which can be performed by each node in a cluster, involves associating a current sequence number with each of several write operations included in a set of independent write operations. In response to detecting that one of the write operations in the set is ready to complete, a new sequence number is selected, and that new sequence number is thereafter used as the current sequence number. None of write operations in the set is allowed to return to the application that initiated the write operations until the new sequence number has been advertised to each other node in the cluster. The method also involves receiving a message advertising a first sequence number from another node in the cluster, and subsequently using the first sequence number as the current sequence number.

7 Claims, 4 Drawing Sheets

SYSTEM AND METHOD FOR MAINTAINING WRITE ORDER FIDELITY IN A DISTRIBUTED ENVIRONMENT

FIELD OF THE INVENTION

This invention relates to data storage systems and, more particularly, to maintaining write order fidelity within a data storage system.

DESCRIPTION OF THE RELATED ART

Write order fidelity and write order consistency are terms that used to describe a system's ability to identify the order in which different units of information are written to storage by an application. A system that preserves write order fidelity is needed in order to create a copy (e.g., a backup or replica) of certain types of information in a way that allows the application to be recovered from the copy. For example, many transaction-based applications require that updates be applied in a particular sequence. A system that preserves write order fidelity will ensure that, when application data used by a transaction-based application is copied, the copy will always be consistent with the sequence of updates that were originally performed by the transaction-based application. If the system does not preserve write order fidelity when creating copies of the application data, the copy may not reflect a correct state of the application data. In such a situation, an attempt to recover the transaction-based application using the copy may lead to errors or application failure.

Typically, write order fidelity is preserved by assigning some sort of ordered identifier, such as a timestamp or sequence number, to each write. These ordered identifiers can be used to properly order the writes when a copy of the application data is created. In a system where only one node can act as a writer, it is relatively simple to assign sequence numbers to writes in the order that those writes are received.

Maintaining write order fidelity is more complicated in a system that allows multiple independent writers. For example, if multiple nodes can independently write to the application data, more than one node may attempt to write to the application data at the same time. Accordingly, the nodes need to be able to coordinate with each other so that writes originating from different nodes can be ordered relative to each other. Typically, this coordination is implemented by centralizing control over sequence numbers or timestamps. For example, one node can be designated as the primary node, which is responsible for generating sequence numbers. Before performing a write to the shared application data, the non-primary nodes must request a sequence number from the primary node. The need to communicate with the primary node before each write operation consumes a significant amount of system resources and can result in slow write performance. Thus, while such a centralized system can provide write order fidelity, it also tends to either result in slower performance and/or be more expensive to implement than is desirable.

SUMMARY

Various embodiments of methods and systems for maintaining write order fidelity in a distributed environment are disclosed. One method, which can be performed by each node in a cluster, involves associating a current sequence number with each of several write operations included in a set of independent write operations. In response to detecting that one of the write operations in the set is ready to complete, a new sequence number is selected, and that new sequence number is thereafter used as the current sequence number. None of write operations in the set is allowed to return to the application that initiated the write operations until the new sequence number has been advertised to each other node in the cluster. The method also involves receiving a message advertising a first sequence number from another node in the cluster, and subsequently using the first sequence number as the current sequence number.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
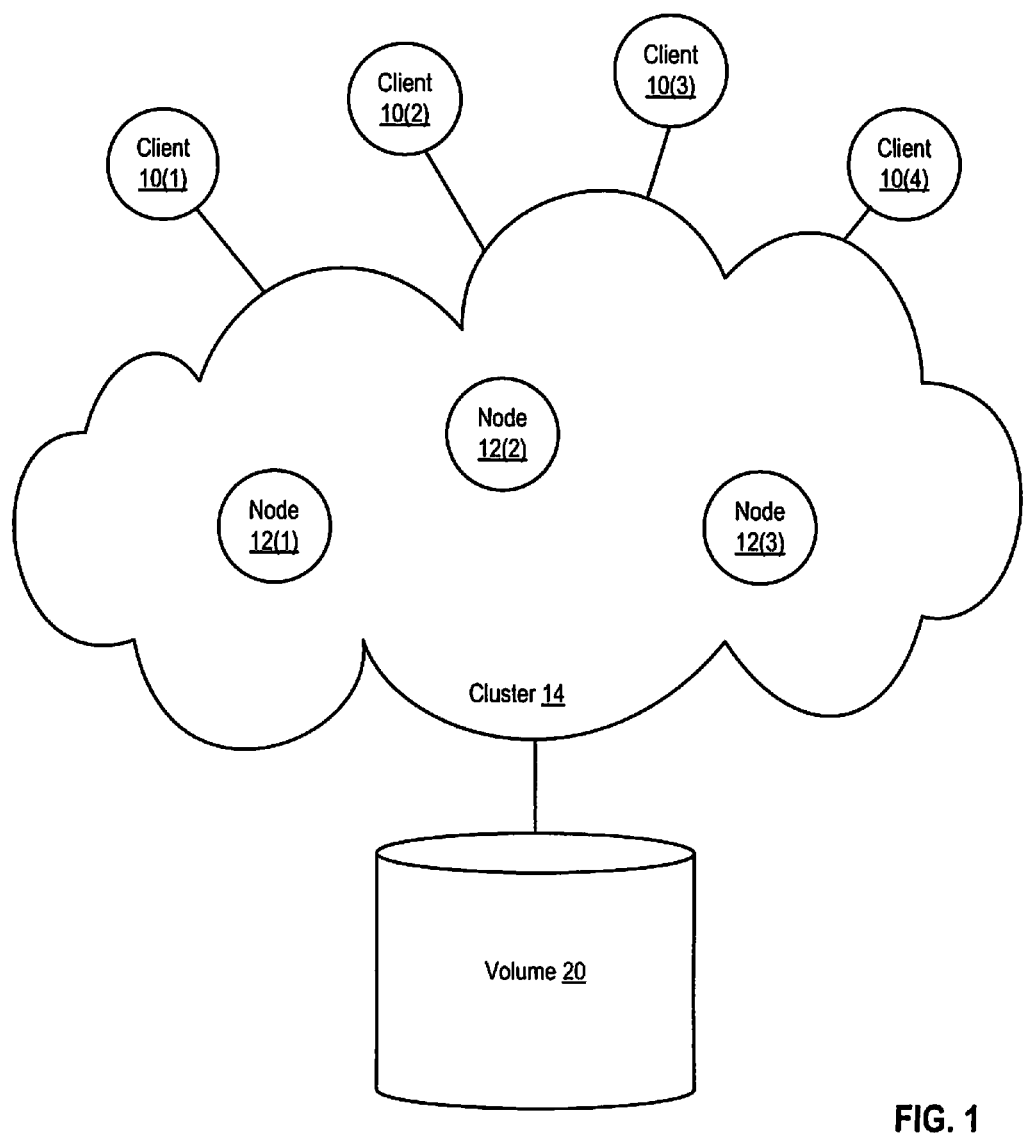
FIG. 1 is a block diagram of a cluster that maintains write order fidelity, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a cluster that maintains write order fidelity. In this example, several clients 10(1)-10(4) are coupled to nodes 12(1)-12(3). Nodes 12(1)-12(3) are organized as a cluster 14. Cluster 14 provides clients 10(1)-10(4) with access to information stored on a volume 20. Clients 12(1)-12(3) can communicate with cluster 14 via a WAN (Wide Area Network), such as the Internet, one or more LANs (Local Area Networks), one or more wireless networks, and the like.

Nodes 12(1)-12(3) are coupled to communicate with each other by one or more networks (represented by the cloud shown in FIG. 1). For example, nodes 12(1)-12(3) can be coupled by one or more private networks. Additionally, nodes 122(1)-122(6) can be coupled by one or more LANs and/or WANs. Private network(s) can be used to communicate cluster-specific messages, such as heartbeat messages, messages used to negotiate sequence numbers (explained in more detail below), and messages effecting cluster membership, among the nodes within cluster 14.

Cluster 14 implements a distributed system that controls access to information (e.g., such as information) stored in volume 20. For example, in one embodiment, each node 12(1)-12(3) instantiates an instance of a file system, so that cluster 14 provides a distributed file system. In another embodiment, each node 12(1)-12(3) instantiates an instance of a volume manager, which provides a virtualized storage device to clients 10(1)-10(4), and thus cluster 14 provides a distributed volume management system. In general, each node 12(1)-12(3) implements an instance of a virtualizing application, such as a file system or volume manager, that presents a virtualized view of data (e.g., by abstracting data into logical constructs such as volumes or files). Each instance of the virtualizing application can initiate write operations (also referred to simply as writes) to information stored on volume 20. Write operations are initiated in response to write requests received from clients 10(1)-10(4). Write operations can be initiated by simply performing the write operations to volume 20, or by sending information representing the write operations across a network (e.g., if cluster 14 is coupled to volume 20 by a network).

Clients 10(1)-10(4) are computing devices. Each client implements a well-behaved application that accesses shared information via cluster 14. For example, in one embodiment, clients 10(14)-10(4) each instantiate an instance of Oracle Real Application Clusters (RAC)™, available from Oracle Corporation of Redwood Shores, Calif. The application is considered "well-behaved" by virtue of being configured to use a serializing mechanism to control access to the information that is shared by all of the clients (the information is shared in that each client can obtain read and write access to information). The serializing mechanism operates to serialize conflicting access to shared information, such that two clients cannot simultaneously modify the same information.

One example of a serializing mechanism is a locking mechanism. In systems that use a locking mechanism to serialize access to shared data, whenever the application needs to write to the shared information, the application uses the locking mechanism to acquire a lock on the portion of the shared information that the application needs to update. The application only obtains write access to the portion of the shared information upon obtaining the lock that corresponds to that portion of the shared information. If another instance of the application has already acquired a lock on that portion of the shared information, the application waits until the other instance of the application has relinquished the lock, and then again attempts to acquire the lock. Thus, use of the locking mechanism prevents two clients from modifying the same information at the same time.

In general, whenever one of clients 10(1)-10(4) needs to modify a portion of the shared information stored on volume 20, that client must go through the serializing mechanism (e.g., to acquire a lock). Once the serializing mechanism provides the client with write access to the portion of the shared information, the client can issue a write requests to modify the portion of the shared information. A node within cluster 14 receives each write request and performs the requested write operation to the shared information stored on volume 14. When the requested write operation has been performed (e.g., once the new values being written have been written to a storage device), cluster 14 notifies the client that the requested write operation has completed. The serializing mechanism prevents any other client from gaining write access to the portion of the shared information until after notification that the write operation has completed has been received by the client. Notifying the client that a write operation requested by the client has completed is referred to herein as allowing the write operation to "return" to the client.

Nodes 12(1)-12(3) within cluster 14 preserve write order fidelity by associating an sequence number (as used herein, the term "sequence number" is used to represent any type of ordered identifier, such as a counter value, timestamp, or the like) with each write operation that is performed to shared information stored in volume 20. For example, if node 12(1) receives a write request from client 10(2), node 12(1) will associate a sequence number with the requested write operation in conjunction with initiating the requested write operation. The write operation modifies shared information stored in volume 20.

Node 12(1) associates a sequence number with a write operation by linking the value(s) being written by the write operation with the sequence number. For example, for each block of data that is modified by a write operation, node 12(1) can write the sequence number associated with the write operation to a metadata location associated with the block of data being modified. As another example, if nodes 12(1)-12(3) initiate write operations via a network, a sequence number can be associated with a write operation by appending the sequence number to the new value(s) being written by the write operation, encoding the sequence number and value(s) in a packet, and sending the packet via the network. It is noted that a variety of other techniques can also be used to associate a sequence number with a write operation.

Additionally, the virtualizing application implemented by nodes 12(1)-12(3) can be located at any of several different layers (e.g., file system layer or volume manager layer) of the data hierarchy, and thus the write requests received by nodes 12(1)-12(3) can specify different granularities (e.g., files, blocks, extents, and the like) of data. Nodes 12(1)-12(3) can associate a sequence number with the data being written by the write operation at the same granularity (e.g., the file granularity or the block granularity) at which the write operation is being performed.

Instead of using a different sequence number for each write operation, nodes 12(1)-12(3) associate the same sequence number with each write operation that is included within a set of one or more independent writes. A set of independent writes (which can also be referred to as a "write-batch") includes at least one write operation. The set is created when a new write operation is initiated. New write operations that are initiated before the any other write operation within the same set has completed are also included in the set of independent writes. Since the application generating the write requests is known to be well-behaved, any writes that are initiated before another write operation has completed are guaranteed to not conflict with the other write operation (or each other). Accordingly, the write operations generated in response to concurrent write requests can be assigned the same sequence number without compromising write order fidelity. In other words, since the writes in a set of independent writes cannot conflict with each other, there is no need to keep track of the order in which those writes occur relative to other writes within the same set of independent writes.

As an example of a set of independent writes, node 12(1) can receive a sequence of write requests to update blocks 1, 2, and 8 of volume 20. In response to the write request to update block 1, which is received first, node 12(1) initiates a write operation to block 1 and associates this write operation with the current sequence number in use at node 12(1). The write request targeting block 2 is received before the write operation to block 1 is ready to complete, and the write request targeting block 8 is received before the write operations to blocks 1 and 2 are ready to complete. Accordingly, node 12(1) initiates write operations that correspond to those write requests and associates those write operations with the current sequence number. The three write operations can complete in any order (e.g., the write operation that modifies block 8 can complete before the write operation to block 1 completes); however, once any write operation within this set of independent writes completes (i.e., once node 12(1) allows the write operation to return to the client that requested the write operation), node 12(1) cannot initiate any new write operations using the same sequence number. It is noted that node 12(1) can define a set of independent writes independent of activity being performed at any other node within cluster 14.

Write operations in different sets of independent writes can be outstanding at the same time. For example, the write to block 8 can still be outstanding when the write to block 1 is ready to complete, which causes node 12(1) to obtain a new sequence number and to advertise the new sequence number to the other nodes. After the other nodes have received the new sequence number, node 12(1) allows the write to block 1 to return to the client. When the write operations to blocks 2 and 8 are ready to complete, node 12(1) can allow those writes to return to the application without generating a new sequence number.

The next write request received by node 12(1) targets block 1 again. Node 12(1) associates the corresponding write operation to block 1 with the new sequence number. This write operation can complete before one or both of the write operations (to blocks 2 and 8) in the previous set of independent writes.

Each of nodes 12(1)-12(3) selects the appropriate sequence number to associate with write operations based on the current sequence used within the node as well as the current sequence numbers in use by the other nodes within cluster 14. For example, if node 12(1) needs to select a new sequence number in order to be able to allow an outstanding write operation to complete, node 12(1) will examine its current sequence number as well as information received from each of the other nodes 12(2) and 12(3) indicating their current sequence numbers. For example, if node 12(2) has sent node 12(1) a message indicating that sequence number 6 is the current sequence number in use at node 12(2), and if node 12(3) has sent node 12(1) a message indicating that sequence number 4 is the current sequence number in use at node 12(3), and if node 1(1) is currently using sequence number 7, node 12(1) can select the highest current sequence number and increment it by one to get a new sequence number, sequence number 9. In response to generating a new sequence number, node 12(1) will send a message advertising the new sequence number to nodes 12(2) and 12(3). After node 12(1) has determined that nodes 12(2) and 12(3) have received the message (e.g., based on acknowledgment messages received from nodes 12(2) and 12(3)), node 12(1) can allow writes in the previous set of independent writes to return. Node 12(1) can also begin using the new sequence number with writes in a new set of independent writes.

In general, each node uses a prespecified algorithm to select a new sequence number, based on the current sequence number(s) in use at each node within the cluster. For example, one algorithm can specify that the node selects the largest current sequence number in use by any node (including itself) within the cluster, and then increments that sequence number. The incremented sequence number is used as the new current sequence number by that node.

Generation and advertisement of a new sequence numbers is performed whenever a node needs to allow the first write operation in a set of independent writes to return to the client that initiated the write operation. It is noted that a node can delay allowing a write operation to return (e.g., in some scenarios, a node may only allow writes to return to the client every 100 milliseconds, as opposed to allowing writes to return as soon as the writes are ready to complete). Regardless of how much (if any) delay the node imposes on the write operation, whenever a node is ready to allow a write operation to return (and thus requiring the creation a new set of independent writes), the node generates and advertises a new sequence number. As noted above, a node can generate and advertise a new sequence number whenever the first write operation (here, "first" refers to the order in which writes are ready to complete, not the order in which the writes within the set were initiated) within a set of independent writes is ready to complete. In this embodiment, the node does not allow the first write operation to return (i.e., the node does not signal completion of the write operation to the application that generated the request for the write operation) until a new sequence number is selected and advertised to the other nodes. In an alternative embodiment, the node can wait until a specific amount of time has passed or until all writes within the set of independent writes are ready to complete.

A node may receive a sequence number from another node (indicating that the other node is about to begin using a new sequence number) while handling a set of independent writes. When the node receives an indication that another node has generated a new sequence number, it indicates that subsequently received write requests may be dependent upon a write that is ready to complete. Thus, the node will need to begin using the new sequence number provided by the other node when handling subsequently initiated writes. For example, if node 12(1) sends a message advertising sequence number 9 as its current sequence number to nodes 12(2) and 12(3), nodes 12(2) and 12(3) will begin using sequence number 9 as their current sequence numbers (there is no need for nodes 12(2) and 12(3) to advertise this, however, since all nodes are already aware that node 12(1) has begun using sequence number 9).

Since the frequency with which the nodes generate new sequence numbers depends on the time taken to complete a write (as opposed to, for example, depending on the number of outstanding writes), the overhead involved in sequence number generation and advertisement will not increase with increasing numbers of outstanding writes. Instead, as load increases, more and more writes will be included in each set of independent writes. Accordingly, the overhead involved in maintaining the write-order fidelity is relatively independent of workload. This can reduce performance degradation that might otherwise occur due to increasing workload.

Additionally, it is noted that the nodes do not need to run in lockstep to implement this technique for maintaining write order fidelity. Thus, each node can process writes independently of processing taking place at the other nodes.

Since sequence number generation is not centralized within cluster 14, there is no need for a specialized failover process or for specialized process to handle nodes that join or leave the cluster. For example, if node 12(1) fails, nodes 12(2) and 12(3) will detect the failure and can continue to generate and advertise sequence numbers among themselves. The only change to the sequence number handling process is that each node will base its sequence number selection on the sequence numbers provided by two cluster members instead of three. Similarly, if a node joins the cluster (e.g., if node 12(1) rejoins the cluster sometime after failing), the cluster membership is updated to include the new node and subsequent advertisement and generation of sequence numbers will take that new node into account. The new node can wait to begin initiating write operations until the new node receives sequence number advertisements from the other nodes, or the new node can request the current sequence number from the other nodes at startup.

Each client 10(1)-10(4) as well as each node 12(1)-12(3) can include one or more computing devices configured to execute software implementing various applications (e.g., a database application, a file system, a volume manager, or the like). Computing devices can include workstations, personal computers, servers, PDAs (Personal Digital Assistants), cell phones, storage network switches, storage devices, storage array controllers, or any other devices configured to execute software implementing such applications. Alternatively, clients 10(1)-10(4) and/or nodes 12(1)-12(3) can be implemented from one or more logic devices (e.g., PLDs, FPGAs, and the like) configured to perform the functions of such applications. Clients 10(1)-10(4) and/or nodes 12(1)-12(3) can also be implemented using logic devices that are configured to perform some of the functions of the applications and that are also configured to execute software implementing other functions of the applications.

Additionally, in some embodiments, several nodes and/or clients are implemented in a single physical computing device. For example, a multiprocessor computer system can be subdivided into several virtual machines, each of which is used to implement one of the nodes in cluster 14. A single physical computing device can also implement both a client and a node.

Volume 20 is provided as an example of a logical or physical storage device that can be used to store shared information. Volume 20 can be implemented from one or more physical storage devices, such as disk drives, arrays of disk drives, Compact Discs (CDs), Digital Versatile Discs (DVDs), and the like.

Figure 2A:
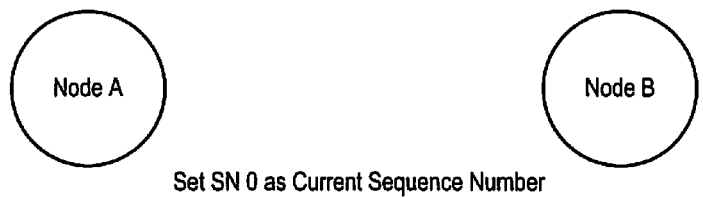
FIG. 2A shows an example of how two nodes initially negotiate a sequence number to use in maintaining write order fidelity, according to one embodiment of the present invention.

FIG. 2A shows an example of how two nodes initially generate a default sequence number to use in maintaining write order fidelity (this situation can occur when the cluster is initialized). As shown, there are two nodes, Node A and Node B, in a cluster. When the cluster initializes, the nodes detect each other (e.g., through techniques for determining cluster membership) and begin using a default sequence number, which is SN 0 in this example. The nodes may also optionally advertise their current sequence numbers to each other (not shown in this example). Since the nodes are using the same sequence numbers, receipt of an advertisement from the other node will not cause either node to begin using a new sequence number.

Figure 2B:
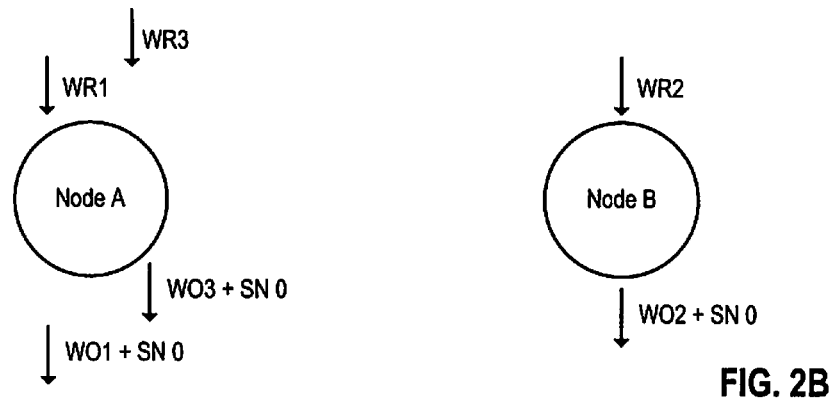
FIG. 2B illustrates how the two nodes independently handle writes during an interval, according to one embodiment of the present invention.

FIG. 2B illustrates how the two nodes independently handle a set of one or more independent writes that are initiated during a particular interval. As shown, Node A receives write requests WR1 and WR3 while Node B receives write request WR2. Node A initiates write operation WO1 in response to WR1. WO1 is associated with SN 0. WR3 is received before WR1 has returned to the client, and thus write operation WO3, which is initiated in response to WR3, is also associated with sequence number SN 0. Similarly, Node B initiates write operation WO2 in response to WR2 and associates WO2 with SN 0.

Figure 2C:
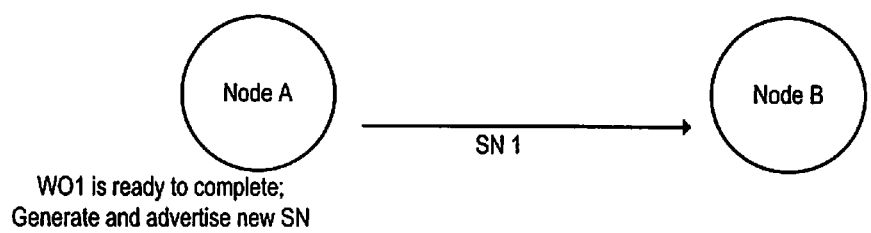
FIG. 2C shows how Node A begins renegotiating for a new sequence number in response to an interval transition, according to one embodiment of the present invention.

FIG. 2C shows how Node A generates and advertises a new sequence number in response to an interval transition. As shown, Node A detects that WO1 is ready to complete. In response, Node A generates a new sequence number, SN 1, and advertises the new sequence number to Node B. Node B can acknowledge the receipt of the message advertising the new sequence number (e.g., if the nodes exchange cluster messages using a protocol such as TCP, acknowledgment is handled by the underlying protocol).

As noted above, a variety of different algorithms can be used to select a new sequence number. In this example, node A selects the highest sequence number (SN 0 in this situation, since both sequence numbers are equal) currently used by any node in the cluster and then increments that number to get a new sequence number, SN 1. Both nodes can now use this sequence number as their current sequence number.

Figure 2D:
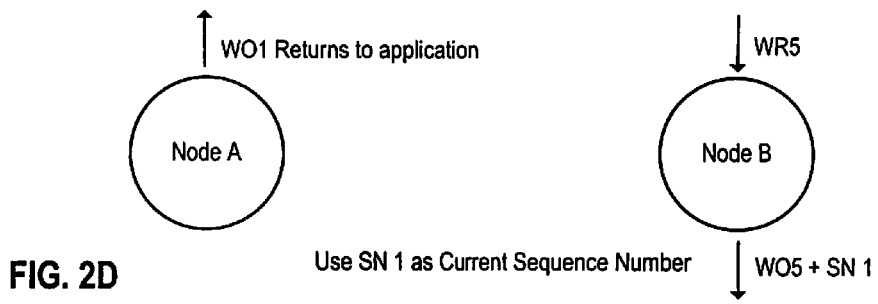
FIG. 2D illustrates how the nodes have selected the new sequence number and moved on to the next interval, according to one embodiment of the present invention.

FIG. 2D illustrates how the nodes have selected the new sequence number and moved on to the next interval. Since its new sequence number has been advertised to the other node in the cluster, Node A now allows WO1 to return to the client that generated WR1. In this example, Node B receives a new write request WR5, initiates a corresponding write operation WO5, and associates this write operation with the new sequence number, SN1.

Figure 3:
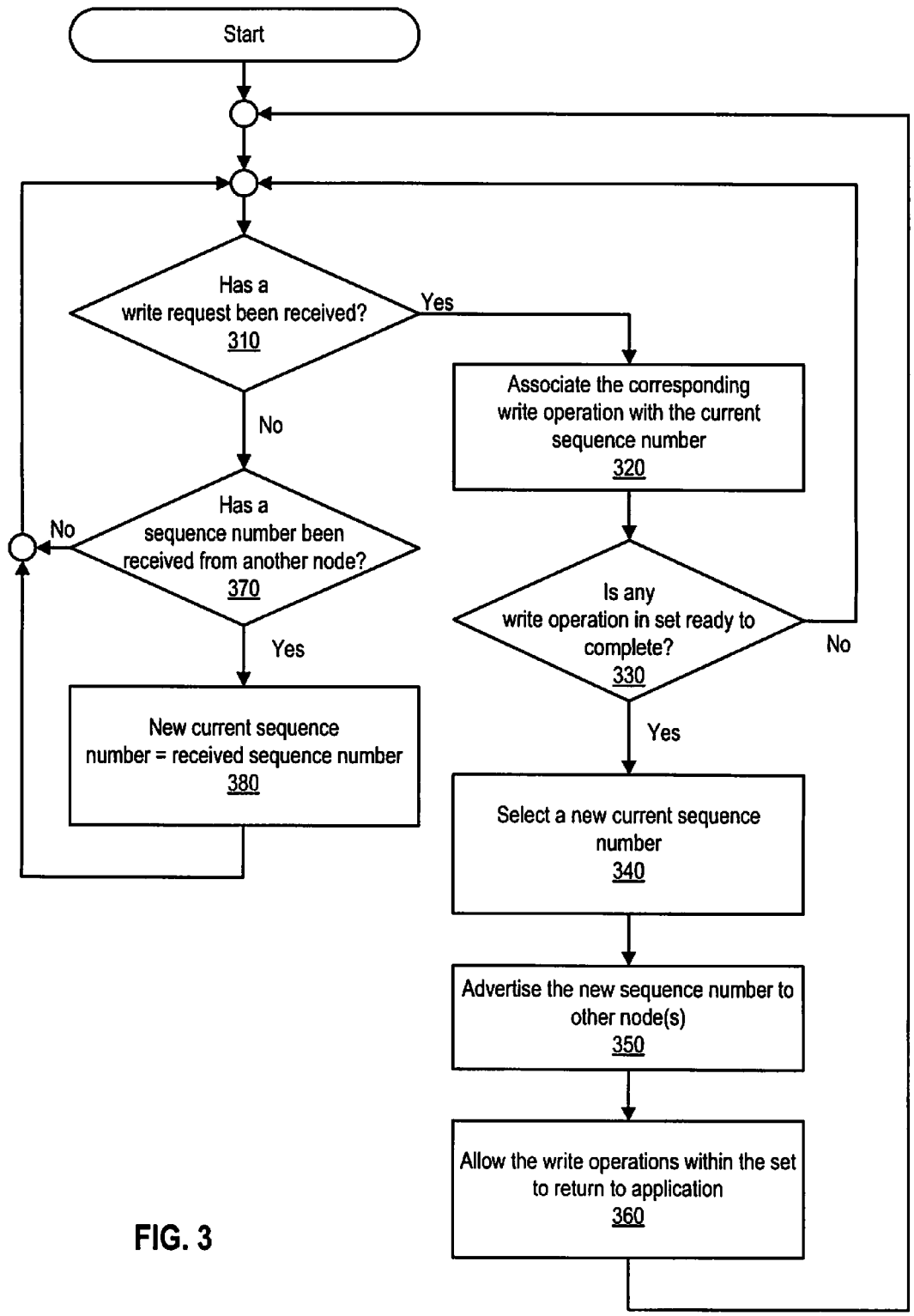
FIG. 3 is a flowchart of one embodiment of a method of maintaining write order fidelity.

FIG. 3 is a flowchart of one embodiment of a method of maintaining write order fidelity. This method can be performed by a node such as nodes 12(1)-12(3) of FIG. 1.

The method begins at 310, when the node waits for write requests. If a write request has been received, the node associates the corresponding write operation with the sequence number currently in use at the node, as shown at 320. All nodes that are associated with the same sequence number are part of the same set of independent writes.

The node monitors whether any write operation in a set of independent writes is ready to complete, as shown at 330. If any of the write operations is ready to complete, the node prevents that write from returning until the node has generated and advertised a new sequence number. It is noted that once one write operation in the set has returned, other writes within that set can return immediately without any additional sequence number processing.

The node selects a new sequence number at 340, based on the sequence numbers (including its own) currently in use within the cluster. For example, in one embodiment, the node selects the highest sequence number currently in use, and then increments that number to generate the new current sequence number. The node begins using this sequence number as its current sequence number (e.g., subsequently requested writes can be associated with this sequence number).

Once a new sequence number is obtained, the node advertises that sequence number to each other node currently included in the cluster, as shown at 350. The node can advertise the sequence number by including the sequence number in messages that are then sent to each other node. The node confirms that the other nodes have received the advertisements (e.g., by using a transmission protocol with built in acknowledgments); if no confirmation is obtained, the node can resend the advertisement. Once the new sequence number has been advertised to the other nodes, the node allows the write operation to return to the application that requested the write operation, as shown at 360.

The node can also receive sequence numbers that are being advertised by other nodes, as shown at 370 and 380. It is noted that these operations can be performed concurrently with operations 310-360. At 370, if the node has received a sequence number from another node, the node updates its sequence number to equal the received sequence number, as shown at 380.

Figure 4:
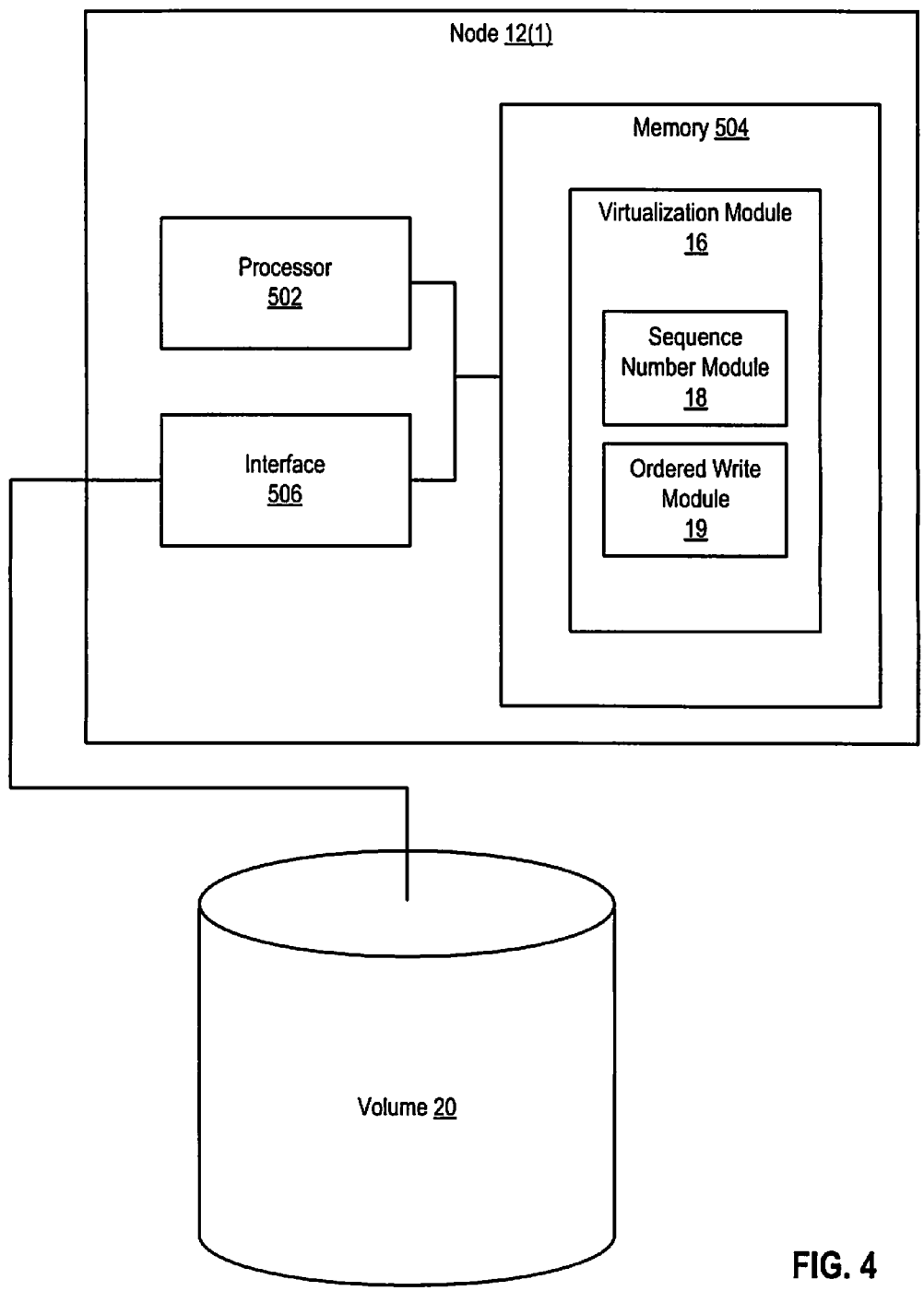
FIG. 4 is a block diagram of a node, according to one embodiment of the present invention.

FIG. 4 is a block diagram of a node 12(1) (e.g., as shown in FIG. 1). As illustrated, node 12(1) includes one or more processors 502 (e.g., microprocessors, PLDs (Programmable Logic Devices), or ASICs (Application Specific Integrated Circuits)) configured to execute program instructions stored in memory 504. Memory 504 can include various types of RAM (Random Access Memory), ROM (Read Only Memory), Flash memory, MEMS (Micro Electro-Mechanical Systems) memory, and the like. Node 12(1) also includes one or more interfaces 506. Processor 502, interface 506, and memory 504 are coupled to send and receive data and control signals by a bus or other interconnect.

Interface 506 can include a network interface to various networks and/or interfaces to various peripheral buses. Interface 506 can include an interface to one or more storage devices, such as those that provide are used to implement volume 20. Interface 506 can also include an interface to a backplane or other private communications network, for use in communicating with other nodes within the cluster.

In this example, program instructions executable to implement an instance of a virtualization module 16 are stored in memory 504. Virtualization module 16 is an instance of a virtualizing application such as a file system or volume manager. Virtualization module 16 can perform a method such as the one shown in FIG. 3.

Virtualization module 16 includes a sequence number module 18 and an ordered write module 19. Sequence number module 18 is configured to participate in the sequence number generation and advertisement process (e.g., to select a new sequence number and to advertise the new sequence number to other nodes). Ordered write module 19 organizes writes into sets of independent writes by associating writes within the same set of independent writes with the same sequence number. Ordered write module 19 ensures that potentially dependent writes are not assigned the same sequence number as writes in earlier sets of independent writes. Ordered write module 19 obtains the current sequence number from sequence number module 18. Whenever ordered write module 19 needs a new sequence number to associate with a new set of independent writes, ordered write module 19 notifies sequence number module 18, which generates and advertises a new sequence number.

The program instructions and data implementing the virtualization module can be stored on various computer readable storage media such as memory 504. In some embodiments, such software is stored on a computer readable storage medium such as a CD (Compact Disc), DVD (Digital Versatile Disc), hard disk, optical disk, tape device, floppy disk, and the like). In order to be executed by processor 502, the instructions and data implementing the virtualization module are loaded into memory 504 from the other computer readable storage medium. The instructions and/or data implementing the virtualization module can also be transferred to node 12(1) for storage in memory 504 via a network such as the Internet or upon a carrier medium.

Although the present invention has been described in connection with several embodiments, the invention is not intended to be limited to the specific forms set forth herein. On the contrary, the present invention is intended to cover such alternatives, modifications, and equivalents as can be reasonably included within the scope of the invention as defined by the appended claims.

What is claimed is:

1. A method comprising:
   receiving a message advertising a first sequence number from another node in a cluster;
   using the first sequence number as a current sequence number;
   associating the current sequence number with each of a plurality of write operations included in a set of independent write operations;
   selecting a new sequence number, in response to detecting that one of the write operations has been performed, wherein
      the write operations are initiated by an application, and
      the new sequence number is based on a value of the current sequence number being used at each node in the cluster;
   sending a message advertising the new sequence number to each other node in the cluster; and
   preventing any of the write operations in the set of independent write operations from returning to the application until the new sequence number has been advertised to each node included in the cluster.

2. The method of claim 1, wherein the associating the current sequence number with a first write operation in the set of independent write operations comprises:
   associating the current sequence number with each block of data being modified by the first write operation.

3. The method of claim 2, wherein the associating the current sequence number with each block of data being modified by the first write operation comprises one of:
   appending the current sequence number to each block of data, prior to transferring each block of data via a network; and
   writing the current sequence number to a storage location associated with each block of data.

4. A node comprising:
   a processor; and
   a memory storing program instructions executable by the processor to implement:
   a sequence number module, wherein
      the sequence number module is configured to
         receive a message advertising a first sequence number from another node in a cluster;
         use the first sequence number as a current sequence number;
         generate a new sequence number, wherein
            the new sequence number is based on a value of a current sequence number being used at each node included in the cluster, and
         advertise the new sequence number to each other node included in the cluster; and
   an ordered write module configured to:
      associate the current sequence number with each of a plurality of write operations included in a set of independent write operations;
      request a new sequence number from the sequence number module, in response to detecting that one of the write operations in the set of independent write operations has been performed, wherein
         the write operations are initiated by an application; and
      prevent any of the write operations in the set of independent write operations from returning to the application until the new sequence number has been advertised to each node included in the cluster.

5. A system comprising:
   a plurality of nodes coupled by a network, wherein
      each of the nodes is configured to receive write requests and initiate corresponding write operations;

each of the nodes is configured to receive a message advertising a first sequence number from another node in a cluster;

each of the nodes is configured to use the first sequence number as a current sequence number;

each of the nodes is configured to associate the current sequence number with each of a plurality of write operations included in a set of independent write operations;

each of the nodes is configured to generate and advertise a new sequence number to each other node, in response to detecting that any write operation within the set of independent write operations has been performed, wherein
- the set of independent write operations is initiated by an application, and
- the new sequence number is based on a value of the current sequence number being used at each node in the cluster; and each of the nodes is configured to prevent any of the write operations in the set of independent write operations from returning to the application until the new sequence number has been advertised to each node included in the cluster.

6. A computer readable storage medium comprising program instructions executable to:

detect reception of a message advertising a first sequence number from another node in a cluster;

use the first sequence number as a current sequence number;

associate the current sequence number with each of a plurality of write operations included in a set of independent write operations;

select a new sequence number, in response to detecting that one of the write operations has been performed, wherein
- the write operations are initiated by an application, and
- the new sequence number is based on a value of the current sequence number being used at each node in the cluster;

send a message advertising the new sequence number to each other node in the cluster; and prevent any of the write operations in the set of independent write operations from returning to the application until the new sequence number has been advertised to each node included in the cluster.

7. A system comprising:

means for detecting reception of a message advertising a first sequence number from another node in a cluster;

means for setting the first sequence number as a current sequence number;

means for associating the current sequence number with each of a plurality of write operations included in a set of independent write operations;

means for selecting a new sequence number, in response to detecting that one of the write operations has been performed, wherein
- the write operations are initiated by an application, and
- the new sequence number is based on a value of the current sequence number being used at each node in the cluster;

network interface means for sending a message advertising the new sequence number to each other node in the cluster; and means for preventing any of the write operations in the set of independent write operations from returning to the application until the new sequence number has been advertised to each node included in the cluster.

* * * * *